(12) United States Patent
Loh

(10) Patent No.: US 7,574,737 B1
(45) Date of Patent: Aug. 11, 2009

(54) SYSTEMS AND METHODS FOR SECURE COMMUNICATION OVER A WIRELESS NETWORK

(75) Inventor: Michael Loh, Calgary (CA)

(73) Assignee: Novatel Wireless, Inc., San Diego, CA (US)

( * ) Notice: Subject to any disclaimer, the term of this patent is extended or adjusted under 35 U.S.C. 154(b) by 503 days.

(21) Appl. No.: 10/116,321

(22) Filed: May 31, 2002

(51) Int. Cl.
*G06F 21/00* (2006.01)
*H04L 9/00* (2006.01)
*G06F 15/16* (2006.01)

(52) U.S. Cl. .................... 726/15; 713/176; 380/270
(58) Field of Classification Search .................. 726/15; 713/176, 180; 235/375; 380/51
See application file for complete search history.

(56) References Cited

U.S. PATENT DOCUMENTS

| | | | | |
|---|---|---|---|---|
| 6,226,748 B1* | 5/2001 | Bots et al. | .................... | 726/15 |
| 6,226,751 B1* | 5/2001 | Arrow et al. | .................... | 726/15 |
| 6,631,416 B2* | 10/2003 | Bendinelli et al. | .......... | 709/227 |
| 6,636,520 B1* | 10/2003 | Jason et al. | ................. | 370/401 |
| 6,765,881 B1* | 7/2004 | Rajakarunanayake | ....... | 370/256 |
| 6,954,790 B2* | 10/2005 | Forslow | ...................... | 709/227 |
| 6,970,459 B1* | 11/2005 | Meier | ........................ | 370/389 |
| 7,072,657 B2* | 7/2006 | Watanabe et al. | ........... | 455/439 |
| 2001/0009025 A1* | 7/2001 | Ahonen | ...................... | 713/161 |
| 2002/0144144 A1* | 10/2002 | Weiss et al. | ................. | 713/201 |
| 2004/0215957 A1* | 10/2004 | Moineau et al. | ............. | 713/153 |

FOREIGN PATENT DOCUMENTS

WO 02/082730 A1 * 10/2002

\* cited by examiner

*Primary Examiner*—Christopher A Revak
(74) *Attorney, Agent, or Firm*—Foley & Lardner LLP

(57) ABSTRACT

A method of secure communication between a wireless device and a target network is presented, comprising receiving a communication addressed to a target network, the communication comprising a data payload and originating from a wireless device on a trusted wireless network, establishing a secure channel with the target network and sending the communication to the target network over the secure channel. The method can further comprise negotiating secure channel parameters with the target network, encrypting the data payload, adding data integrity protection to the communication, encapsulating the communication according to a VPN protocol, authenticating the wireless device as an authorized user of the private network and granting access to a target network resource.

55 Claims, 10 Drawing Sheets

SYSTEMS AND METHODS FOR SECURE COMMUNICATION OVER A WIRELESS NETWORK

FIELD OF THE INVENTION

The present invention relates to wireless communication and more particularly, to systems and methods for secure communication over a wireless network.

BACKGROUND INFORMATION

With the advent of every new forum of communication comes efforts to develop ways to ensure the privacy of communications travelling over that forum. Private communications discriminate between the intended audience and all others. A lack of privacy means the communication can be seen or heard by anyone willing to listen, and whatever information within the communication, confidential or not, is compromised by exposure to the public. The assurance that communications are kept private in the channel gives a user confidence and incentive to utilize that forum.

There are numerous ways of protecting a communication from the public. One is by communicating through trusted networks only, such as the plain old telephone service (POTS) or the public switched telephone network (PSTN). The PSTN is the international collection of land lines dedicated to telephone service. A communication directed from one party to another moves directly over the PSTN with little risk of compromise, unless a third party physically taps into the PSTN and eavesdrops on the communication. Although the potential for eavesdropping is a security risk, it is minimal compared to the risks inherent in sending communications over an untrusted public network, where all parties on the network have visibility into each communication passed over the network.

Communication over an untrusted public network, however, can provide certain advantages. Public networks such as the Internet, provide an inexpensive and ubiquitous forum for communication, enabling an entire host of users to communicate directly with each other in a way unmatched by any private network. However, since the communications are public, any party can intercept and read the messages sent. This potential for compromised communications has led to the development of secure channels.

Secure channels, such as virtual private networks (VPNs), allow communications to be sent over public networks with little risk of compromise. For instance, a remote user can send an email over the public network to a target network, such as a corporate intranet, without having to use solely trusted networks such as the PSTN or POTS. In order to do this, the remote user would use a client device, such as a personal computer (PC) or notebook computer, to establish a secure channel with the target network. The client device requires additional overhead in order to format the communications to the correct protocol. This overhead includes secure communication software and hardware capabilities sufficient to correctly establish the secure channel, and to perform the high degree of processing necessary to configure the communication for secure transmittal over the public network.

In addition to the client device overhead, overhead is added to the communications themselves as a result of the formatting required for transport over the secure channel. This added overhead typically increases the size of the communications. Therefore, the amount of processing, memory and bandwidth necessary to transport a communication increases even though the message content of the communication itself stays the same.

BRIEF DESCRIPTION OF THE DRAWINGS

The details of the present invention, both as to its structure and operation, may be gleaned in part by study of the accompanying drawings, in which like reference numerals refer to like parts, and in which.

SUMMARY

The systems and methods for secure communication over a wireless network provide for secure communication between a wireless device and a target network. The wireless device sends a communication to a communication module within a trusted wireless network. The communication module is configured to send the communication to the target network through a secure channel. The secure channel protects the privacy of the communication sent over a public network.

The communication module can be configured to interface with multiple networks, including the target network and the trusted wireless network. The communication module preferably contains a channel manager, which manages the secure channel connected to the communication module. The communication module also preferably includes several sub-modules with distinct functionalities. These sub-modules can include an encapsulation sub-module for encapsulating communications, an authentication sub-module for authenticating the identity of a user, an access control sub-module for managing the access control policies of the secure communication system and a data security sub-module for managing and implementing the data security measures of the secure communication system.

DETAILED DESCRIPTION

1. Introduction

Figure 1:
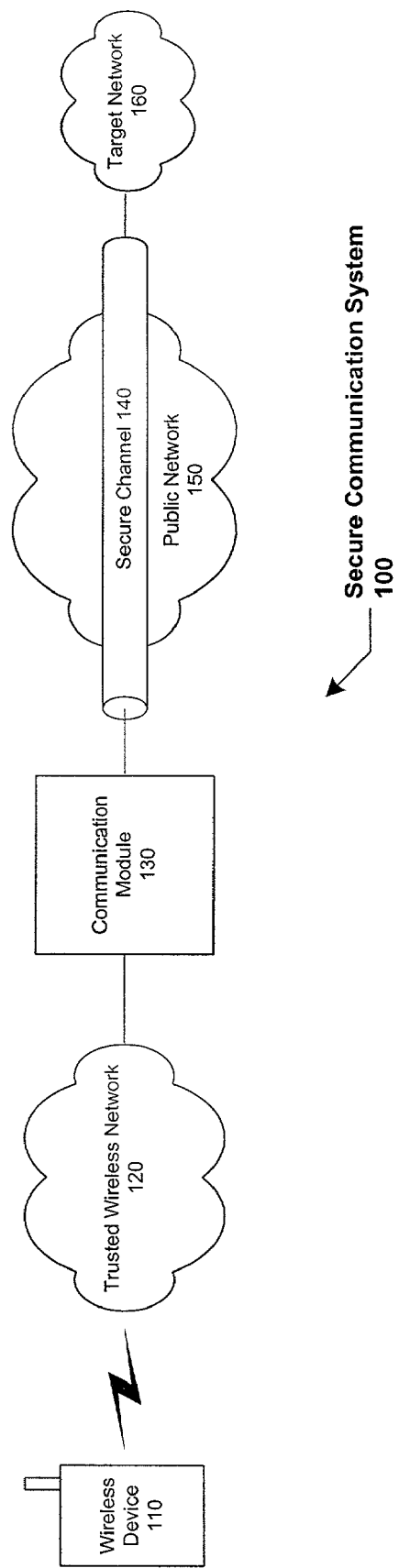
FIG. 1 is a schematic view of a secure communication system according to one embodiment of the present invention.

The systems and methods for secure communication over a wireless network enable a wireless device to securely communicate with a target network over a public network. FIG. 1 depicts secure communication system 100, which illustrates one embodiment of the systems and methods described herein. Within secure communication system 100, secure channel 140 extends over public network 150 between communication module 130 and target network 160. Wireless device 110 sends a communication over trusted wireless network 120 to communication module 130, which formats the communication and sends it to target network 160 over secure channel 140. Conversely, target network 160 can communicate with wireless device 110 by sending a communication over secure channel 140 to communication module 130, which the relays the communication to wireless device 110 over trusted wireless network 120.

Secure communication system 100 provides the advantage of offloading the secure communication overhead generally required to format communications for transmission over secure channel 140. The functionality provided by this overhead, which is incorporated into the client device in conventional systems, is instead integrated into communication module 130. This provides numerous advantages, most notably to wireless device 110, such as reduced requirements in size, memory, processing capability and power consumption.

Secure communication system 100 maintains privacy by utilizing the security features of trusted wireless network 120 to keep communications between wireless device 110 and communication module 130 private. The private nature of a communication received at communication module 130 is preserved by using secure channel 140 for transmission to target network 160, which is also a trusted network. In this manner, the communication is protected from compromise by third parties.

In addition, because secure channel 140 does not extend over trusted wireless network 120, the added communication overhead is no longer required for communications sent over trusted wireless network 120. This decrease in size of the communications provides an increase in the amount of available bandwidth within trusted wireless network 120. The decreased size also reduces the amount of processing and memory necessary to transport a communication over trusted wireless network 120.

2. Example Environment

Before describing secure communication system 100 in detail, it is useful to describe a simple example environment in which secure communication system 100 can be implemented. One such environment is the exchange of confidential email between two employees of a corporation, where one employee has local access to the trusted corporate intranet and the other is located offsite and must connect remotely.

The remote employee uses wireless device 110, such as a wireless personal digital assistant (PDA), to connect to the Internet over trusted wireless network 160. Wireless device 110 can be any device configured to communicate voice or text using wireless or radio frequency (RF) transmission over the air. Examples of wireless device 110 include a PDA having a wireless modem, a mobile phone, a PDA-mobile phone combination, a PC or notebook computer with a wireless modem, and any other devices capable of wireless communication. Wireless device 110 preferably contains an interface to facilitate communication over the Internet, such as a microbrowser supported by the wireless application protocol (WAP) or a short message service (SMS) interface.

Trusted wireless network 120 can be any wireless communication channel that incorporates methods to secure the communications travelling within that channel. The level of security required by one user may not be sufficient for another, therefore the adequacy of the security methods varies dependent upon the user and the application. Examples of trusted wireless network 120 include, but are not limited to, Wireless Service Providers (WSPs) and Wireless Internet Service Providers (WISPs) such as AT&T and Sprint.

Once connected to the Internet, the remote employee sends an electronic mail (email), containing confidential information, over a plurality of networks and until it is ultimately received by the employee with local access to the corporate intranet. Once the email arrives to the corporate intranet it typically passes through a firewall before then being routed to the local employee.

A corporate intranet is one embodiment of target network 160. Corporations are examples of entities which have sizable interests in private communication. Corporate intranets are typically local area networks (LANs) or wide area networks (WANs) designed to allow employees to communicate with each other through email, file sharing and other internal intranet activities. The corporate intranet generally also allows employees to communicate externally over public networks through the firewall, which guards the intranet from compromise. Target network 160, however, can be any network or entity configured for communication over a secure channel including, but not limited to, a corporate intranet, a home network and a university intranet.

Secure communication system 100 is described herein in terms of an example corporate environment and an email exchange application. Description in these terms is provided for ease of discussion only. Accordingly, these examples are not intended to limit the invention to particular applications.

For the purposes of illustration in the description herein, the Internet will be used as an example of public network 150, but it is understood that there are many types of public networks that can be utilized with the systems and methods described herein. Since the Internet is a packet switched network, all communications sent between communication module 130 and target network 160 are in the form of packets. The format of the packet is dependent on the protocols being used, however most typical packets contain a header and a data payload. The header contains the address of the communication's destination and the data payload contains the content of the communication itself.

3. Trusted Wireless Network

Because wireless transmissions are so easily intercepted, any system employing wireless communication must take steps to ensure privacy. In fact, every major digital wireless standard has incorporated supplemental measures to ensure privacy. This has created a level of trust in wireless networks which bestows users with enough confidence to exchange confidential information over the air. Two measures typically used to ensure privacy are encryption and authentication. For instance, Code Division Multiple Access (CDMA) and Global System for Mobile communications (GSM) both use encryption techniques to scramble the communications before transmission over the air.

Encryption is a cryptographic tool for coding a message so that only someone possessing the correct decryption key or keys can read it. CDMA actually encrypts each message twice, once to code the message and again as part of the CDMA spread spectrum modulation technique. Spread-spectrum techniques multiply the message by a codeword unique to each user. This encrypts the message before transmission and spreads the frequency spectrum of the transmission from narrowband to wideband. Because of the wide bandwidth of a spread spectrum signal, and the multitude of spread spectrum signals being transmitted at any one time, the message appears as nothing more than background noise to anyone trying to locate the message signal in it's frequency spectrum. As a result it is very difficult to jam, interfere with, identify or intercept.

Another tool for wireless security is authentication. Authentication verifies that the user operating the wireless device is who he or she claims to be. GSM incorporates a Subscriber Identity Module (SIM) in each wireless device, which stores information unique to each user. Using a challenge and response procedure, the GSM network is capable of verifying the identity of the individual operating the wireless device.

Secure communication system 100 relies on the measures incorporated in trusted wireless network 120 to safeguard the privacy of communications transmitted between wireless device 110 and communication module 130. Future generations of wireless technology, including, but not limited to Wideband CDMA (W-CDMA), Enhanced Data rates for Global Evolution (EDGE) and cdma2000 standards will all incorporate communication security measures capable of implementation into secure communication system 100.

4. Secure Channel

Secure channel 140 protects the privacy of the communication as it is transmitted over public network 150. Although the systems and methods described herein anticipate numerous types of secure channels 140, for ease of illustration secure channel 140 will be described in terms of a VPN. Secure communication system 100 can be configured to incorporate any combination of the facets used to protect communication in a VPN, including encapsulation, authentication, access control and data security.

A. Interface

Figure 2:
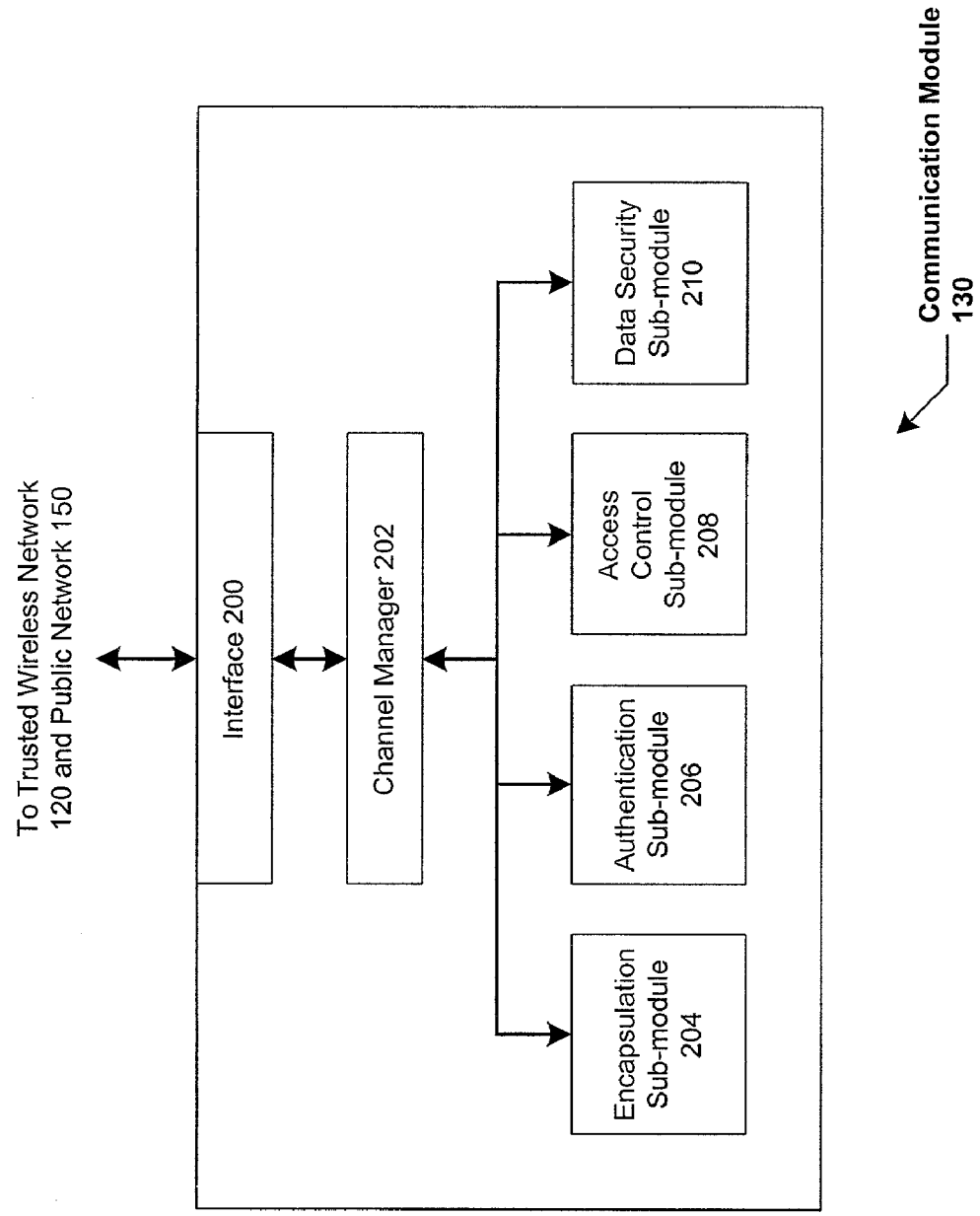
FIG. 2 is a schematic view of one embodiment of a communication module according to the present invention.

Secure channel 140 preferably has two end-points located on opposite sides of public network 150, in positions where privacy is protected. In FIG. 1, the end-points are located at target network 160 and communication module 130. FIG. 2 depicts one embodiment of communication module 130 according to the systems and methods described herein. Communication module 130 has an interface 200, which is configured to communicate with trusted wireless network 120 and with public network 150. In the illustrated embodiment, public network 150 is the Internet, so interface 200 can include a network interface card (not shown) or other type of interface to the Internet dependent upon the network connection.

In an embodiment where communication module 130 connects to trusted wireless network 120 over a similar network connection as that needed for the Internet, interface 200 can use the same network interface card for both connections. However interface 200 can be configured with any interface hardware and software capable of communicating with trusted wireless network 120, independent of the hardware and software necessary to communicate with public network 150.

B. Channel Manager

Although FIG. 1 shows communication module 130 only handling communications between one wireless device 110 and one target network 160, there can, in fact, be many different wireless devices 110 communicating with many different target networks 160 simultaneously, each target network 160 having it's own secure channel 140 with communication module 130. Communication module 130 includes channel manager 202, which manages the secure channels 140 that connect to communication module 130.

Channel manager 202 negotiates a set of secure channel parameters with target network 160, in order to establish secure channel 140 with the proper VPN protocol. Channel manager 202 also negotiates with wireless device 110 to obtain the address information of target network 160 as well as the information used for authentication of the wireless device. In addition, channel manager 202 is capable of further negotiation with wireless device 110 and target network 160 in order to exchange information needed for custom or standardized security procedures or other communication procedures put in place to maintain or facilitate communication.

Channel manager 202 also processes the communications being sent and received over secure communication system 100. All communication traffic is directed to the correct sub-module by channel manager 202. For instance, a communication received from wireless device 110 at interface 200 is transferred to channel manager 202. Channel manager 202 then directs the communication to each sub-module needed to properly format the communication according to the requirements of the specific secure channel 140 which connects to the destined target network 160. Correspondingly, channel manager 202 directs any communication received from target network 160 to each sub-module needed to properly format the communication according to the requirements of the particular trusted wireless network 120 which is in communication with the destined wireless device 110.

In one embodiment, channel manager 202 is a processor enabled with software capable of managing the many-to-many communication traffic passing through communication module 130. However, channel manager 202 can be any hardware and/or software configuration capable of processing and directing the communication traffic to the proper sub-module as well as negotiating with wireless device 110 and target network 160.

C. Sub-Modules

Communication module 130 further includes sub-modules configured to format the communications to allow them to be sent to the correct destination. FIG. 2 depicts four embodiments of sub-modules within communication module 130: encapsulation sub-module 204, authentication sub-module 206, access control sub-module 208 and data security sub-module 210. Each of these sub-modules connects to channel manager 202 and performs specific functions upon communications directed from channel manager 202. Each of these sub-modules 204, 206, 208 and 210 can further be configured to communicate with each other, providing, in one embodiment, a path where a communication is formatted and passed to the next sub-module without reverting to channel manager 202 in between. Each of sub-modules 204, 206, 208 and 210 can be implemented in either hardware, software or a combination of the two.

1) Encapsulation Sub-Module

Encapsulation sub-module 204 is configured to encapsulate a communication being sent over secure channel 140 and decapsulate a communication received over secure channel 140. Encapsulation is the process of inserting one packet into another, so that the inserted packet is opaque to the outside viewer. When an encapsulated packet is sent over the Internet it is typically referred to as transporting the packet through a tunnel, or tunneling. Encapsulation sub-module 204 can be configured to support any VPN tunneling protocol, including, but not limited to layer 2 protocols such as Point-to-Point Tunneling Protocol (PPTP), Layer Two Forwarding Protocol (L2F) and Layer Two Tunneling Protocol (L2TP). Layer 3 protocols such as Internet Protocol Security (IPsec) and layer 2/layer 3 hybrid protocols such as Multiprotocol Label Switching (MPLS) are also supported.

In one embodiment a communication destined for target network 160 requires encapsulation before being sent. Upon receiving the communication, channel manager 202 directs the packet or packets making up the communication to encapsulation sub-module 204. There the packet is encapsulated according to the VPN protocol being used, by inserting the received packet into another packet for transport over public network 150. Likewise, if the communication is received from target network 160 and destined to wireless device 110, encapsulation sub-module 204 would decapsulate the packet by removing the encapsulating packet and allowing the inserted packet to again be visible.

2) Authentication Sub-Module

Authentication sub-module 206 is configured to authenticate the source of communications received from wireless device 110, the source being either a user or an entity. This authentication is in addition to the authentication performed by trusted wireless network 120, and the goal of verifying the identity of the user remains the same. Authentication sub-module 206 can be configured to support any VPN authentication scheme, including, but not limited to passwords, security tokens, smartcards, authentication headers, Password Authentication Protocol (PAP), Extensible Authentication Protocol (EAP), Remote Access Dial In User Service (RADIUS), Kerberos and Public Key Infrastructure (PKI).

In another embodiment, a user attempting to establish communication with target network 160 must be authenticated as a prerequisite to establishing secure channel 140. Using client software located on wireless device 110, the user supplies username and password information to authentication sub-module 206. Authentication sub-module 206 then negotiates with target network 160 in order to authenticate the user before establishing secure channel 140. Target network 160 then supplies authentication sub-module 206 with the secure channel parameters needed to establish secure channel 140. These parameters can include VPN configuration values, IP addresses, subnet mask values and Maximum Transmission Unit (MTU) values. Communication module 130 relays the information needed by wireless device 110, such as the IP address of target network 160. Consequently, the user identity has been verified by authentication sub-module 206 and communication module 130 has established a clear communication channel with wireless device 110.

3) Access Control Sub-Module

Access control sub-module 208 is configured to manage the access control policies safeguarding target network 160. Access control in a VPN dictates whether a protected network resource can be accessed by VPN users. The conditions that define the access control policy are typically based on the attributes of the user, the attributes of the resource, and the environmental conditions at the time of request. Access control sub-module 208 can be configured to manage and/or facilitate the exchange of these attributes and conditions as well as make the policy decisions granting or denying access to target network 160 resources. Access control sub-module 208 can also be configured to support any VPN, standard or custom access control policy, including, but not limited to policies implementing Access Control Lists (ACLs) and Capabilities lists (C-lists).

In another embodiment, after a user is authenticated, a policy decision is required to grant the user access to target network 160 resources before secure channel 140 is established. Access control sub-module 208 makes the decision to grant or deny access to the network resources by comparing user and resource attributes supplied during the authentication process, in addition to the present environmental conditions, to the set of conditions supplied by target network 160. Once access is granted, secure channel 140 is established. It is understood that this is an example of one of many possible access control procedures, and one of ordinary skill can readily implement the many variations possible with the systems and methods described herein.

4) Data Security Sub-Module

Data security sub-module 210 is configured to manage and implement the data security policies safeguarding communications sent over secure communication system 100. These policies include data encryption and data integrity protections such as checksums and digital signatures. Because data security typically touches on all aspects of a VPN, data security sub-module 210 can be configured to manage and implement security in every VPN communication, including negotiations and exchanges taking place prior to the establishment of secure channel 140.

Encryption over secure channel 140 shares the same goal as the encryption performed by wireless networks, which is to protect the privacy of communications that are intercepted by unauthorized users. Data security sub-module 210 can be configured to support any VPN, standard or custom encryption technique, including, but not limited to shared key cryptographic structures such as Data Encryption Standard (DES), triple DES (3DES) and the Advanced Encryption Standard (AES), as well as public key cryptographic structures such as RSA (named for Ronald Rivest, Adi Shamir, and Leonard Adleman). Accordingly, data security sub-module 210 also supports the various key generation, negotiation and exchange protocols such as Internet Key Exchange (IKE), which accompany the various encryption techniques.

Data integrity measures satisfy the need to ensure that the communication has not been altered during transit. Data security sub-module 210 can be configured to implement any VPN or other data integrity technique capable of implementation in secure channels. These measures can include simple checksums, message authentication codes (MACs) and digital signatures such as public key cryptography.

In another embodiment, a communication with a digital signature is encrypted before being sent over secure channel 140. Data security sub-module 210 adds the digital signature to the data payload and then encrypts both using 3DES. The IP address of the target network is then added to the communication and it is handed off to encapsulation sub-module 204 to be encapsulated before being sent.

Sub-modules 204, 206, 208 and 210 described herein can be configured to perform and implement a wide variety of security measures. There are embodiments where the functionality of two or more sub-modules can overlap, for instance when authentication and access control procedures are simultaneous. In these cases the functionality provided by one sub-module 204, 206, 208 and 210 can be offloaded onto another. The sub-modules can be separate (as illustrated) or combined. The actual configuration of the sub-modules 204, 206, 208 and 210 is dependent upon the needs of the application in which it is placed.

5. Wireless PDA Embodiments

Figures 3A, 3B:
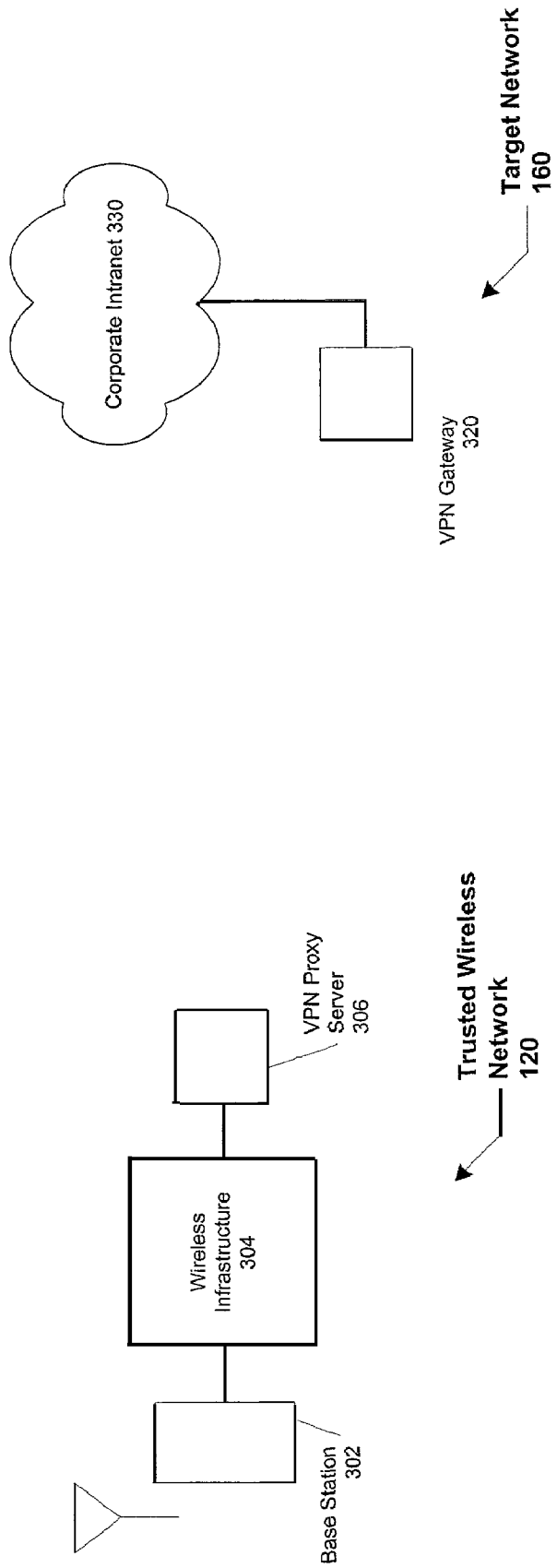
FIG. 3A is a block diagram illustrating a trusted wireless network according to an embodiment of the present invention.
FIG. 3B is a block diagram illustrating a target network according to an embodiment of the present invention.

FIG. 3A depicts an embodiment of trusted wireless network 120, in accordance with the systems and methods described herein. Trusted wireless network 120 includes base station 302 and VPN proxy server 306, both of which are communicatively connected to wireless network infrastructure 304. Base station 302 is configured to transfer communications between wireless device 110 (not shown) and wireless network infrastructure 304. Wireless network infrastructure 304 is the configuration of hardware and software that processes, manages and routes communication traffic passing within trusted wireless network 120. Wireless network infrastructure 120 transfers communications between base station 302 and VPN proxy server 306, which is an embodiment of communication module 130.

FIG. 3B depicts an embodiment of target network 160, in accordance with the systems and methods described herein. Target network 160 includes VPN gateway 320 communicatively connected to corporate intranet 330. VPN gateway 320 is configured to transfer secure communications between VPN proxy server 306 and corporate intranet 330. Corporate intranet 330 transfers communications between VPN gateway 320 and the entity or user within corporate intranet 330 sending or receiving the communication. Wireless device 110 can also gain access to corporate intranet 330, which can be a network resource on target network 160.

Figure 3C:
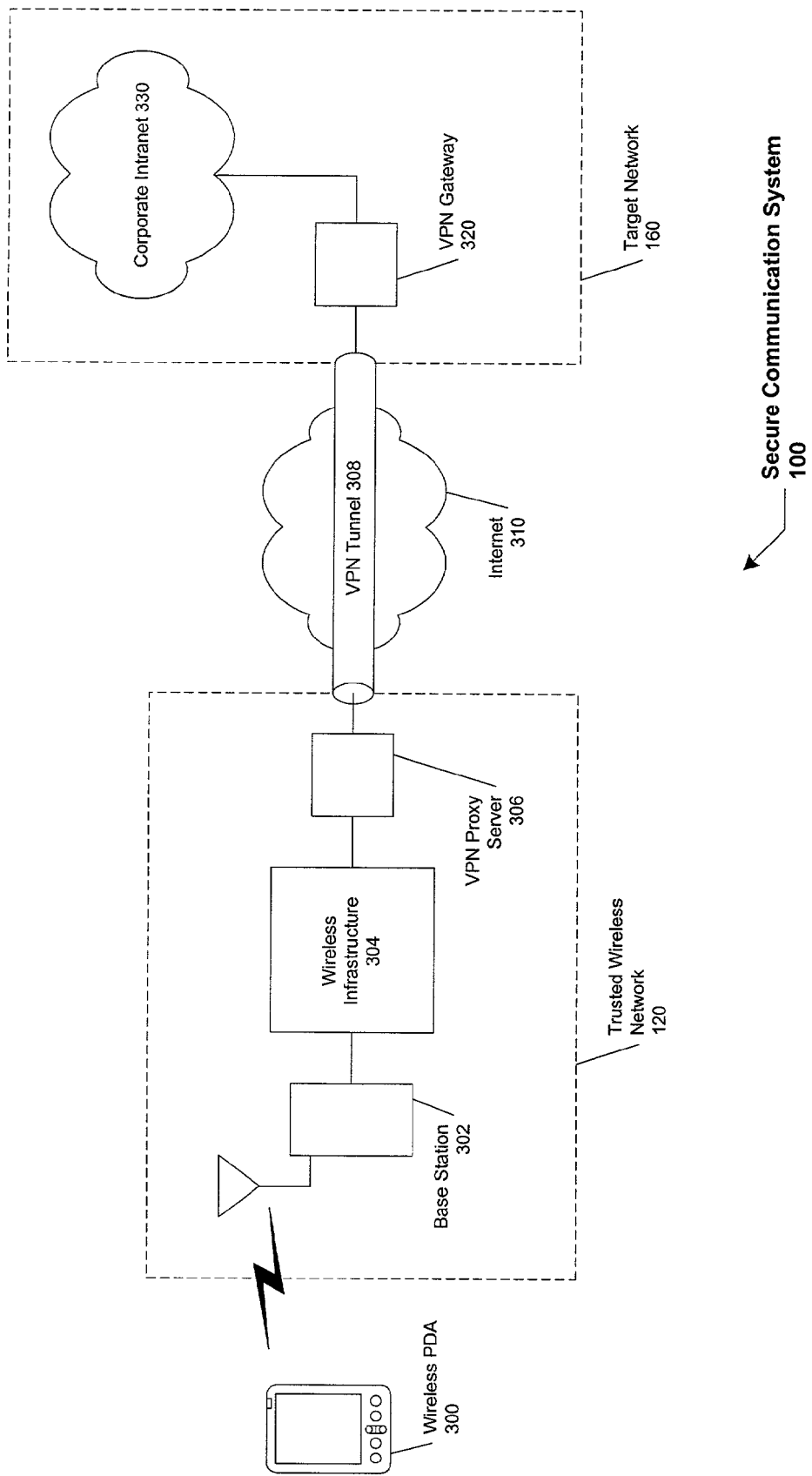
FIG. 3C is a block diagram illustrating a secure communication system according to an embodiment of the present invention.

FIG. 3C depicts an embodiment of secure communication system 100, in accordance with the systems and methods described herein, illustrating both trusted wireless network 120 and target network 160 shown in FIGS. 3A and 3B respectively. Wireless PDA 300, an embodiment of wireless device 110, is communicatively coupled with trusted wireless network 120 and is configured to communicate with base station 302 using wireless transmission. VPN proxy server 306 and VPN gateway 320 are configured to establish VPN tunnel 308, which is an embodiment of secure channel 140. VPN tunnel 308 connects VPN proxy server 306 and VPN gateway 320 over Internet 310, which is an embodiment of public network 150.

Figure 4:
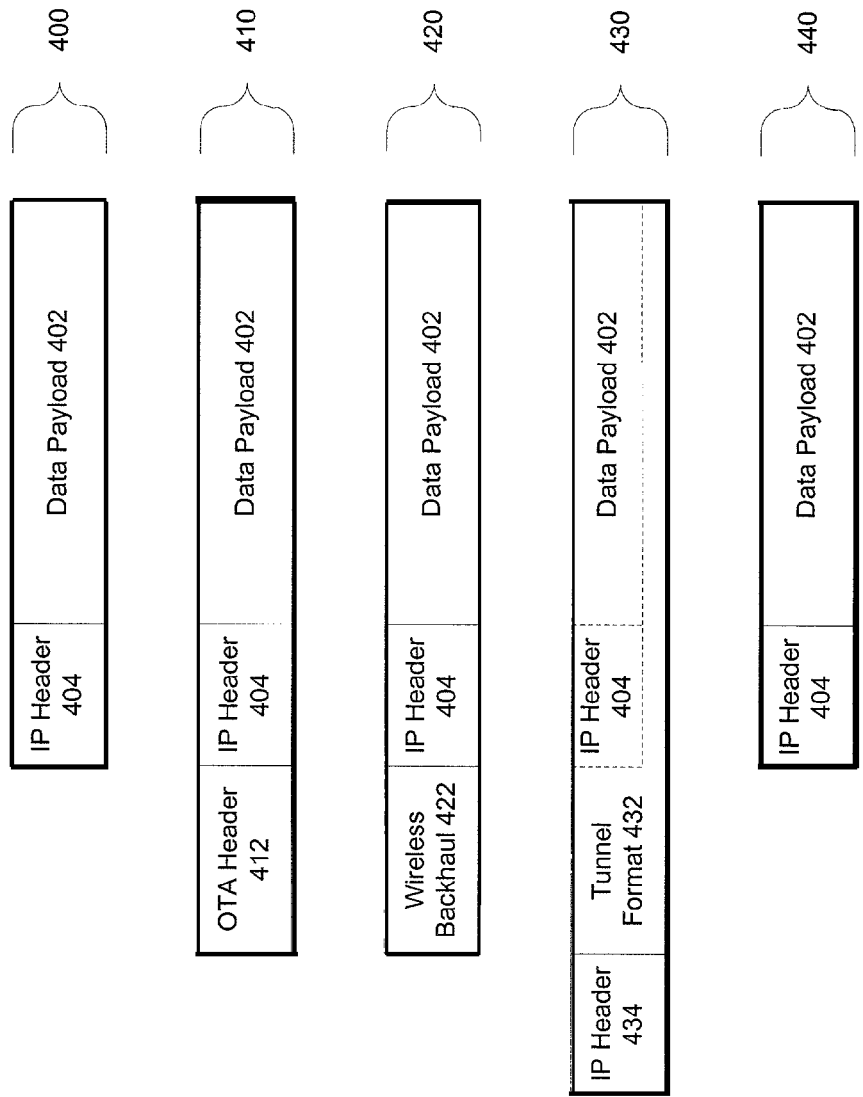
FIG. 4 is a block diagram of a communication at various stages of transmission over the secure communication system depicted in FIG. 3C, according to an embodiment of the present invention.

FIG. 4 depicts a communication at various stages of transmission over the embodiment of secure communication system 100 that is depicted in FIG. 3C. Wireless PDA 300 formats the data to be sent as data payload 402 and adds the address information as IP header 404, together making communication 400. A modem within wireless PDA 300 adds Over-the-Air (OTA) header 412 to communication 400 to create communication 410. OTA header 412 formats the communication for wireless transmission according to the wireless protocol used by trusted wireless network 160, such as General Packet Radio Service (GPRS) and 1x Radio Transmission Technology (1xRTT).

Once communication 412 is received at base station 302, OTA header 412 is stripped off and replaced with wireless backhaul 422, forming communication 420. Trusted wireless network 160 typically institutes a custom networking protocol designed for communication within the network according to the needs and configuration of wireless infrastructure 304. Wireless backhaul 422 is formatting which enables communication 420 to be routed through wireless infrastructure 304 to VPN proxy server 306.

VPN proxy server 306 strips wireless backhaul 422 from communication 420 and adds tunnel format 432 for transport over VPN tunnel 310. Tunnel format 432 can include encryption of IP header 404 and data payload 402, the addition of data security measures and encapsulation according to the VPN protocol used by VPN tunnel 308. VPN proxy server 306 also adds new IP header 434 to form communication 430, which can then be transported over VPN tunnel 308 to VPN gateway 320.

VPN gateway 320 strips IP header 434 from communication 430 and also removes tunnel format 432 by decapsulating, decrypting and removing data security where necessary. After IP header 404 and data payload 402 are removed, the remaining IP header 404 and data payload 402 constitute communication 440, which directly corresponds to communication 400. Communication 440 can then be relayed to the destination within corporate intranet 330.

In one embodiment, before VPN tunnel 308 can be established the authentication and access control requirements of target network 160 must be met. In the embodiment shown in FIG. 3, this can involve a negotiation procedure between wireless PDA 300, VPN proxy server 306 and VPN gateway 320. A user operating wireless PDA 300 first requests VPN access to corporate intranet 330. Wireless PDA 300 makes the access request to VPN proxy server 306 and provides the username, password, client identification (ID) and port ID associated with the user and wireless device 300. VPN proxy server 306 forwards this request to VPN gateway 320. VPN proxy server 306 and VPN gateway 320 then undergo a challenge and response procedure to determine if access should be granted to wireless PDA 300.

If wireless PDA 300 is granted access, VPN gateway 320 provides secure channel parameters such as configuration values, IP address, subnet mask, MTU, compress switch and other information necessary to establish VPN tunnel 308. Once VPN proxy server 306 receives this information it will supply wireless PDA 300 with the necessary configuration values, IP address and subnet mask to use in communication with VPN proxy server 306. As a result of this exchange, a communication channel between wireless PDA 300 and VPN proxy server 306, as well as VPN tunnel 308 can be established, allowing secure communications to be sent between wireless PDA 300 and corporate intranet 330.

6. WAP Mobile Phone Embodiments

Figure 5B:
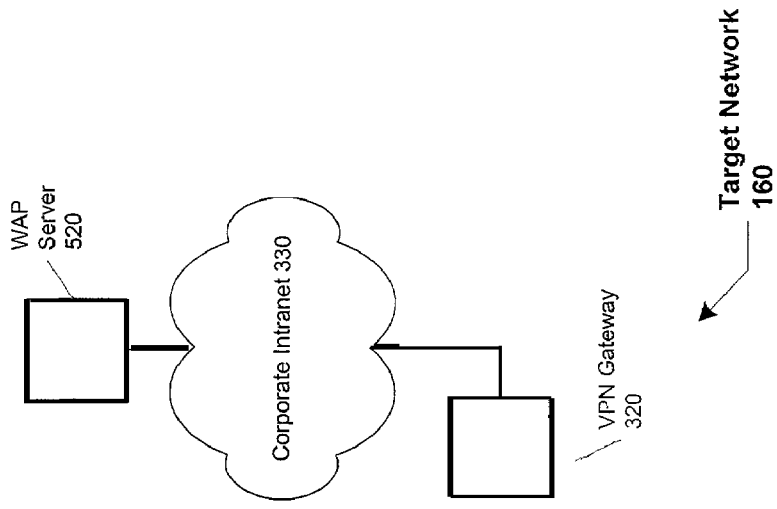
FIG. 5B is a block diagram illustrating a target network according to an embodiment of the present invention.
Figure 5A:
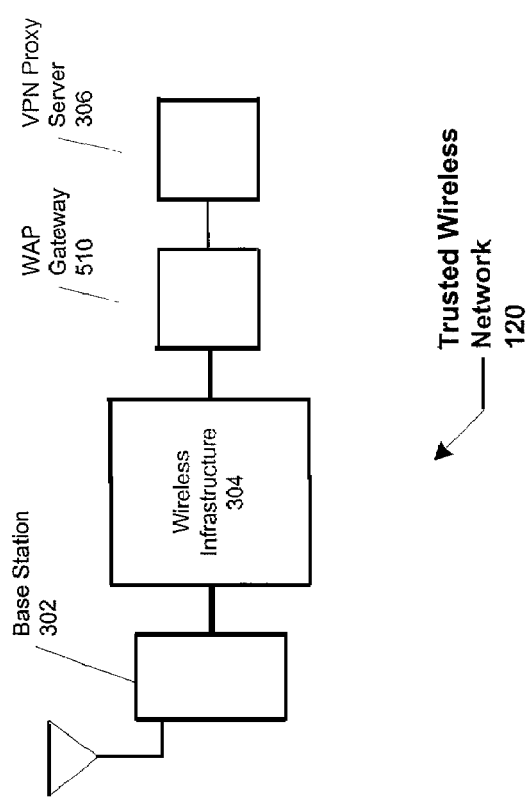
FIG. 5A is a block diagram illustrating a trusted wireless network according to an embodiment of the present invention.

FIG. 5A depicts another embodiment of trusted wireless network 120, in accordance with the systems and methods described herein. Trusted wireless network 120 is similar to the embodiment depicted in FIG. 3A, but also includes WAP gateway 510. WAP gateway 510 communicatively connects with wireless network infrastructure 304 and VPN proxy server 306. WAP gateway 510 is configured to process and format WAP-based communications sent over secure communication system 100.

FIG. 5B depicts another embodiment of target network 160, in accordance with the systems and methods described herein. Target network 160 is similar to the embodiment depicted in FIG. 3B, but also includes WAP server 520. WAP server 520 is communicatively connected to corporate intranet 330. WAP server 520 is configured to serve WAP-based files from within target network 160. The files can be remotely accessed by wireless device 110 configured for WAP communication over secure communication system 100.

Figure 5C:
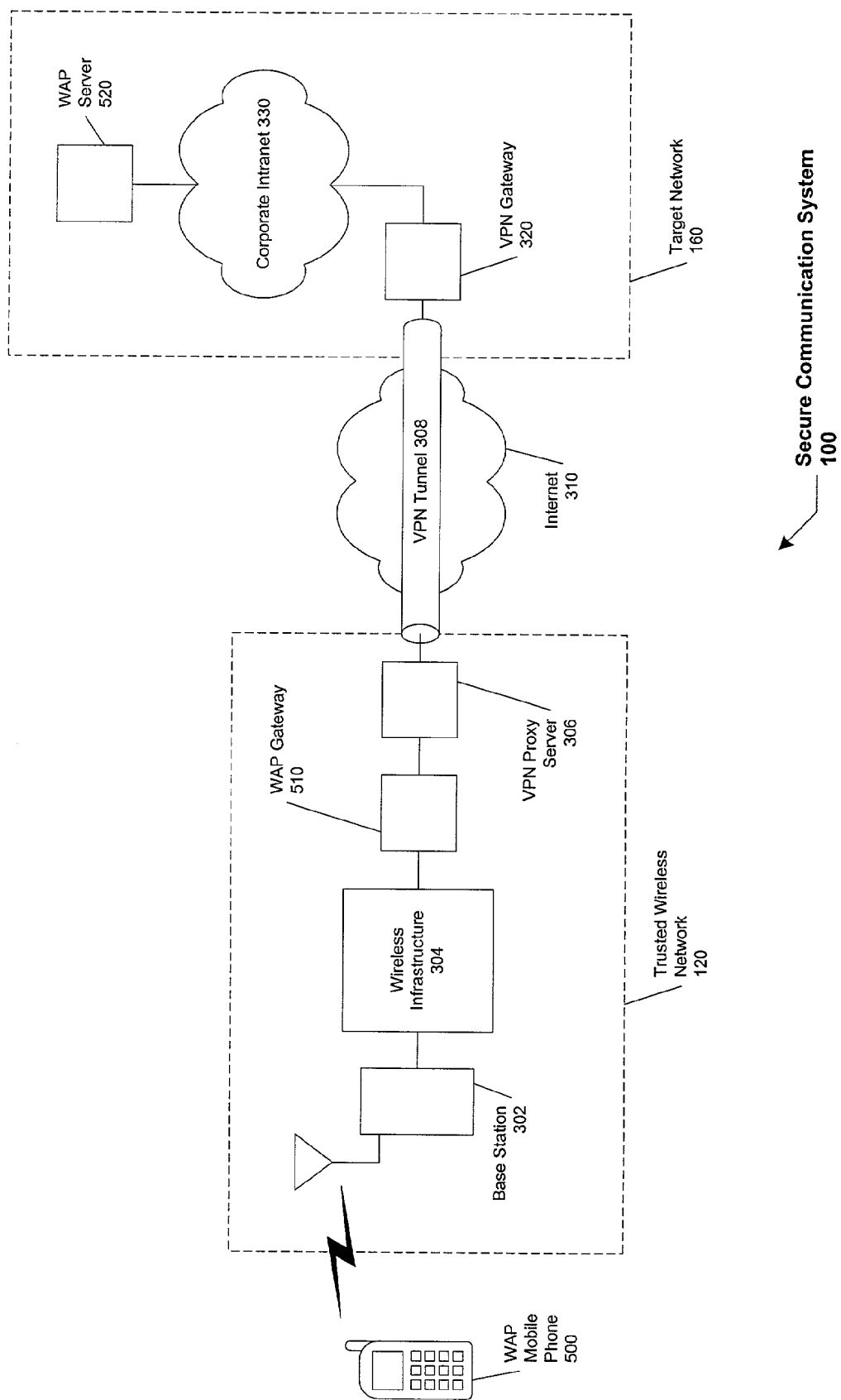
FIG. 5C is a block diagram illustrating a secure communication system according to an embodiment of the present invention.

FIG. 5C depicts an embodiment of secure communication system 100, in accordance with the systems and methods described herein, illustrating both trusted wireless network 120 and target network 160 shown in FIGS. 5A and 5B respectively. In FIG. 5C, WAP mobile phone 500, an embodiment of wireless device 110, is communicatively coupled with trusted wireless network 120 and configured to access information on WAP server 520, located within target network 160, using wireless transmission. Although this embodiment contains WAP mobile phone 500, any WAP enabled wireless device can be used.

To meet the authentication and access control requirements of target network 160, the embodiment depicted in FIG. 5 uses a negotiation procedure between WAP mobile phone 500, WAP gateway 510, VPN proxy server 306 and VPN gateway 320. A user operating WAP mobile phone 500 first requests VPN access to WAP server 520. WAP mobile phone 500 makes the access request to WAP gateway 510, which includes a WAP server to navigate to VPN proxy server 306. The access request made by WAP mobile phone 500 includes the VPN proxy server locator and the username, password, client identification (ID) and port ID associated with the user and WAP mobile phone 500. WAP gateway 510 also includes software which enables WAP gateway 510 to exchange communications with WAP mobile phone 500 and VPN proxy server 306 and to act as an intermediary between them. WAP gateway 510 then forwards the access request to VPN proxy server 306.

VPN proxy server 306 undergoes a negotiation procedure with VPN gateway 320 to determine if access should be granted to WAP mobile phone 500. If WAP mobile phone 500 is granted access, VPN gateway 320 provides the secure channel parameters, necessary to establish VPN tunnel 308, to VPN proxy server 306, which in turn supplies WAP mobile phone 500 with the necessary information to use in communication with VPN proxy server 306 by way of WAP gateway 510. As a result of this exchange, a communication channel between WAP gateway 510 and VPN proxy server 306, as well as VPN tunnel 308 can be established, allowing secure communications to be sent between WAP mobile phone 500 and corporate intranet WAP server 520.

Figure 6:
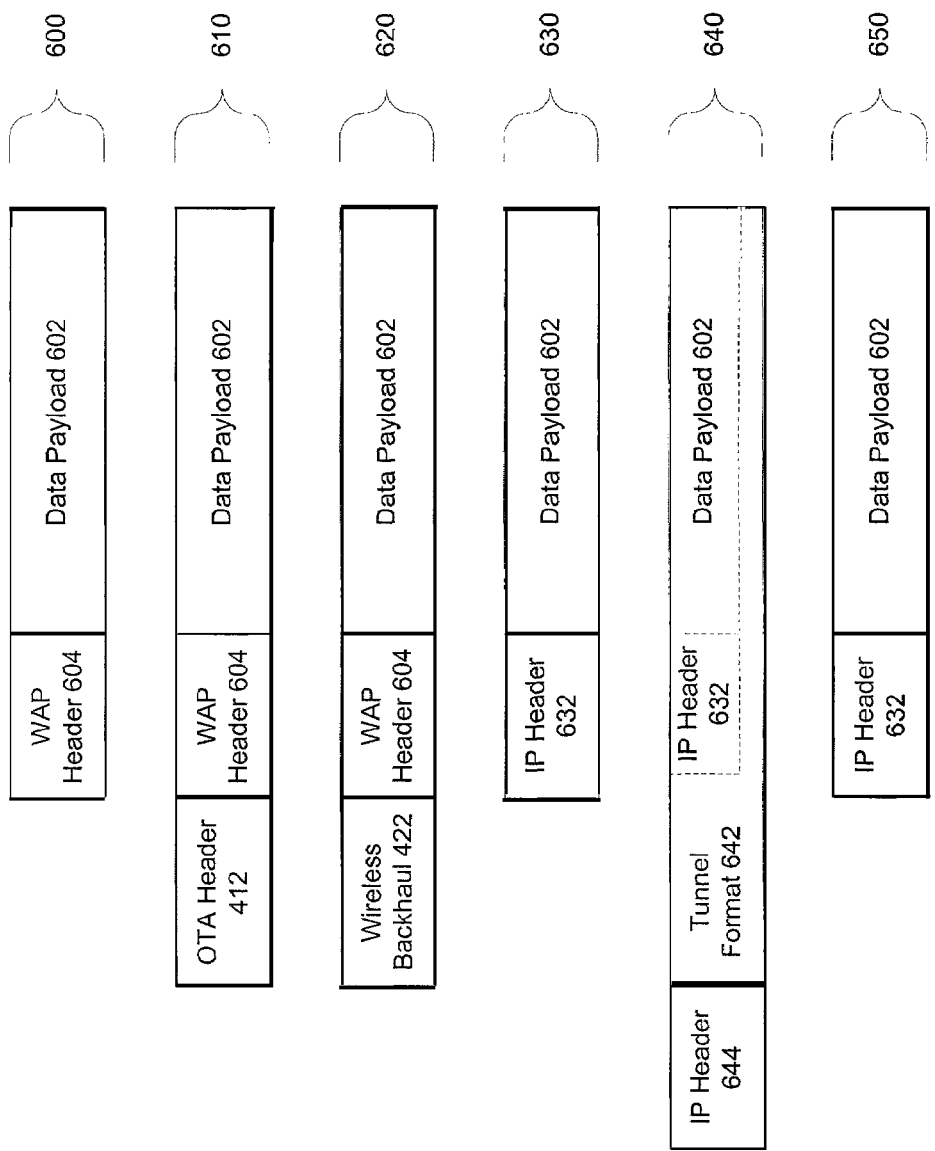
FIG. 6 is a block diagram of a communication at various stages of transmission over the secure communication system depicted in FIG. 5C, according to an embodiment of the present invention.

FIG. 6 depicts a communication originating from WAP mobile phone 500 and addressed to WAP server 520 at various stages of transmission over secure communication system 100 depicted in FIG. 5. In this embodiment, WAP mobile phone 500 uses a version one (1.x) WAP protocol, which uses the WAP protocol stack including Wireless Datagram Protocol (WDP), Wireless Transport Layer Security (WTLS), etc. WAP mobile phone 500 formats the data to be sent as data payload 602 and adds the address information in WAP 1.x format as WAP header 604, together making communication 600. Over-the-Air (OTA) header 412 is added to communication 600 to create communication 610. Once communication 412 is received at base station 302, OTA header 412 is stripped off and replaced with wireless backhaul 422, forming communication 620.

WAP gateway 510 strips wireless backhaul 422 from communication 620 and reformats WAP header 604 as IP header 632 to form communication 630. IP header 632 contains the address information from WAP header 604 in IP format in order to enable communication 632 for transport over Internet 310. The Wireless Application Environment (WAE) protocol is not reformatted since it is typically necessary for access to WAP server 520.

VPN proxy server 306 adds new IP header 644 and tunnel format 642 for transport over VPN tunnel 308. This is illustrated as communication 640. Tunnel format 642 can include encryption of IP header 644 and data payload 602, the addition of data security measures and encapsulation according to the VPN protocol used by VPN tunnel 308. VPN gateway 320 strips IP header 644 and also removes tunnel format 642 from communication 640. The remaining IP header 632 and data payload 602 constitute communication 650, which directly corresponds to communication 600 and can be relayed to WAP server 520 within target network 160.

Figure 7:
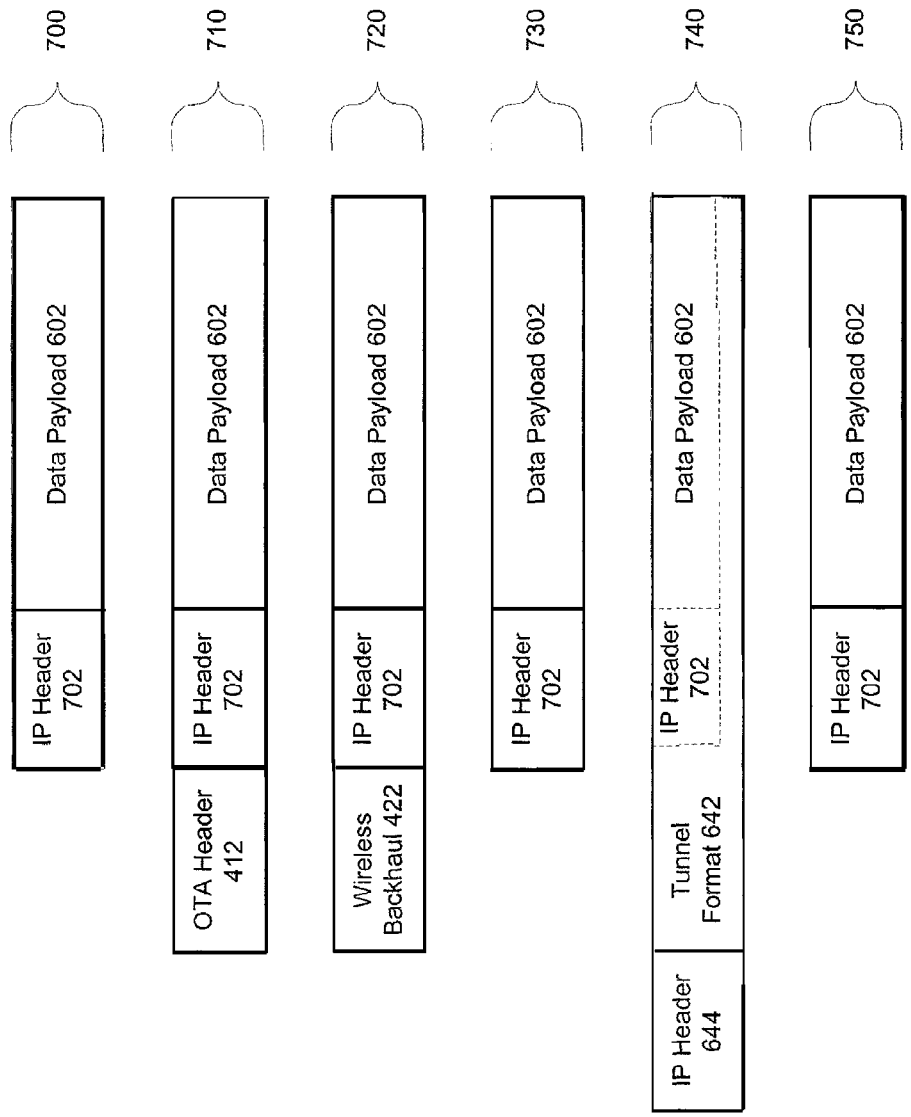
FIG. 7 is a block diagram of a communication at various stages of transmission over the secure communication system depicted in FIG. 5C, according to an embodiment of the present invention.

FIG. 7 depicts an embodiment similar to that of FIG. 6, except where WAP mobile phone 500 uses a version two (2.x) WAP protocol. WAP 2.x uses the IP stack for transport. In this embodiment, WAP mobile phone 500 formats the address information as IP header 702 in WAP 2.x format, and adds it to data payload 602 together making communication 700. Because WAP 2.x uses IP for transport, no reformatting is necessary at WAP gateway 510 and IP header 702 remains unchanged in communication 730.

Figure 8:
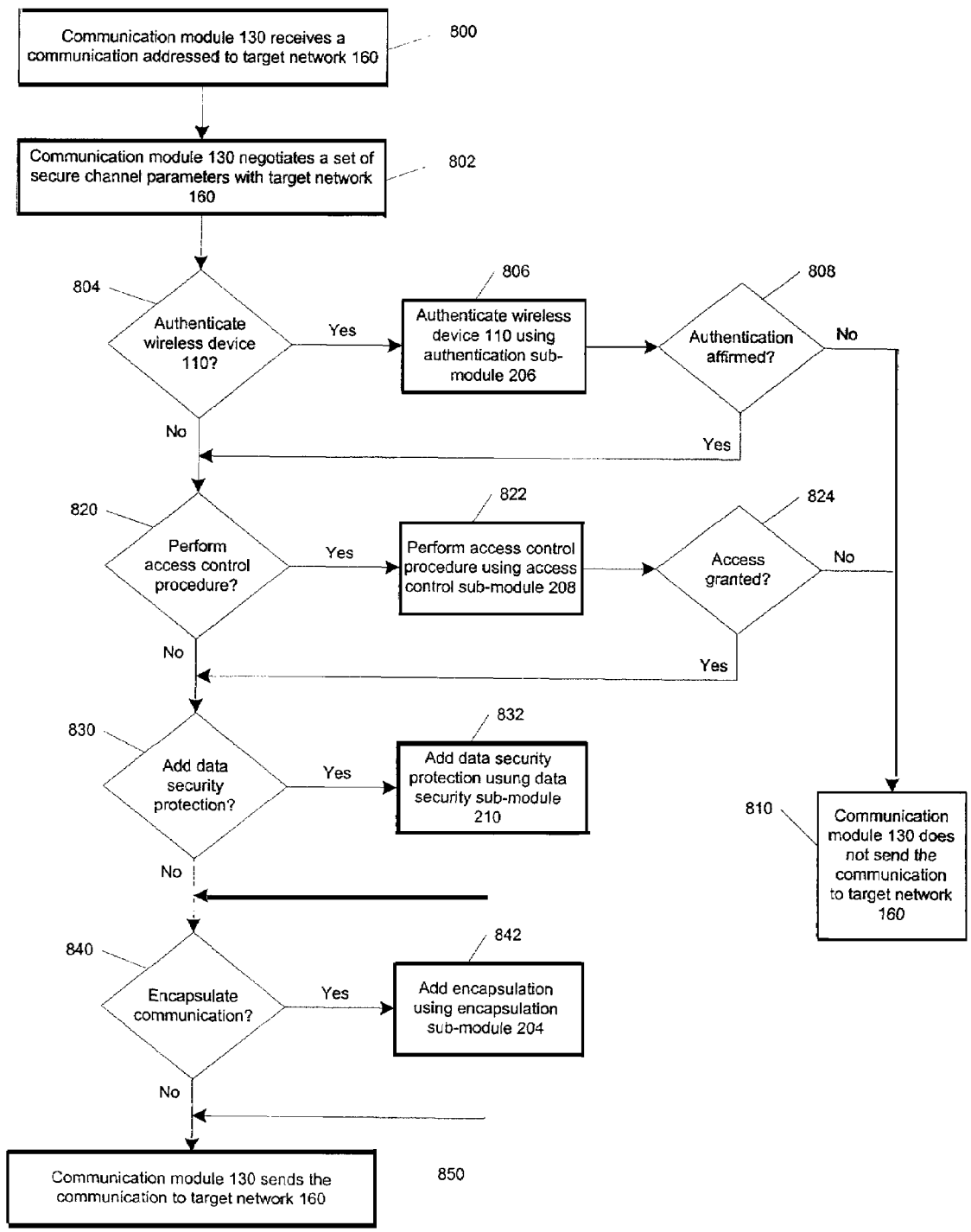
FIG. 8 is a flow chart of a method for sending a communication from a wireless device to a target network according to one embodiment of the present invention.

FIG. 8 depicts one embodiment of a method for sending a message from wireless device 110 to target network 160. At 800, communication module 130 first receives a communication addressed to target network 160 from wireless device 110. At 802, communication module 130 negotiates a set of secure channel parameters with target network 160. Communication module 130 then decides whether to authenticate wireless device 110 at 804, negotiating additional secure channel parameters as needed. If wireless device 110 needs to be authenticated, authentication sub-module 206 will perform the authentication process at 806. If authentication is denied, the communication is not sent to target network 160 as shown at 810. If authentication is affirmed, communication module 130 decides whether to perform an access control procedure at 820.

If communication module 130 needs to perform an access control procedure, access control sub-module 208 performs the procedure at 822, again negotiating additional secure channel parameters if needed. If access is denied, the communication is not sent as shown at 810. If access is granted, communication module 130 proceeds to 830, where the decision is made whether to add data security protection to the communication in accordance with the secure channel parameters.

If communication module 130 needs to add data security protection, data security sub-module 210 adds the protection at 832. Afterwards, communication module 130 proceeds to 840, where the decision is made whether to encapsulate the communication in accordance with the secure channel parameters. If communication module 130 decides encapsulation is needed, encapsulation sub-module 204 encapsulates the communication at 842. Once the encapsulation is performed, the communication is sent to target network 160 at 850.

While the particular systems and methods for secure communication over a wireless network herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of secure communication between a wireless device and a target network, comprising:
    receiving a communication addressed to a target network, the communication comprising a data payload and originating from a wireless device communicatively coupled with a trusted wireless network;
    establishing a secure channel to the target network from a communication module positioned between the target network and the trusted wireless network, the secure channel not extending over the trusted wireless network; and
    sending the communication to the target network over the secure channel.

2. The method of claim 1, wherein establishing the secure channel further comprises establishing a virtual private network (VPN) tunnel.

3. The method of claim 1, wherein establishing the secure channel further comprises establishing the secure channel over a public network.

4. The method of claim 1, wherein establishing the secure channel further comprises negotiating a set of secure channel parameters with the target network.

5. The method of claim 1, wherein establishing the secure channel further comprises encrypting the data payload.

6. The method of claim 1, wherein establishing the secure channel further comprises adding data integrity protection to the communication.

7. The method of claim 6, wherein adding data integrity protection comprises adding a digital signature to the communication.

8. The method of claim 1, wherein establishing the secure channel further comprises encapsulating the communication.

9. The method of claim 8, wherein encapsulating the communication comprises encapsulating the communication according to a VPN protocol.

10. The method of claim 1, wherein establishing the secure channel further comprises authenticating the wireless device as an authorized user of the target network.

11. The method of claim 1, wherein establishing the secure channel further comprises receiving access to a network resource coupled with the target network.

12. The method of claim 1, further comprising:
    receiving a communication addressed to the wireless device from the target network over the secure channel; and
    sending the communication to the wireless device over the trusted wireless network.

13. The method of claim 12, wherein sending the communication to the wireless device further comprises:
    decapsulating the communication; and
    decrypting the data payload.

14. The method of claim 12, wherein sending the communication to the wireless device further comprises removing data integrity protection.

15. The method of claim 14, wherein removing the data integrity protection further comprises removing a digital signature.

16. The method of claim 12, wherein sending the communication to the wireless device further comprises formatting the communication for transmission over the trusted wireless network.

17. A system for secure communication between a wireless device and a target network, the system comprising:
    a channel manager configured to establish a secure channel with a target network; and
    an interface configured to receive a communication comprising a data payload from a wireless device over a trusted wireless network, and further configured to send the communication to the target network over the secure channel, the secure channel extending to the target network from a communication module positioned between the target network and the trusted wireless network,
    wherein the secure channel does not extend over the trusted wireless network.

18. The system of claim 17, wherein the secure channel is a virtual private network (VPN).

19. The system of claim 17, wherein the secure channel spans a public network.

20. The system of claim 17, wherein the interface is further configured to send a packetized communication to the target network.

21. The system of claim 17, wherein the interface is further configured to send an encrypted communication to the target network.

22. The system of claim 17, wherein the interface is further configured to send an encapsulated communication to the target network.

23. The system of claim 17, wherein the interface is further configured to send a communication having data integrity protection to the target network.

24. The system of claim 23, wherein the data integrity protection comprises a digital signature.

25. The system of claim 17, wherein the interface is further configured to receive a communication addressed to the wireless device over the secure channel.

26. The system of claim 17, wherein the interface is further configured to send a communication originating from the target network to the wireless device over the trusted wireless network.

27. The system of claim 17, wherein the interface is further configured to send a decrypted communication to the wireless device.

28. The system of claim 17, wherein the interface is further configured to send a decapsulated communication to the wireless device.

29. The system of claim 17, wherein the channel manager is further configured to interface with at least one sub-module.

30. The system of claim 17, further comprising an encapsulation sub-module configured to encapsulate and decapsulate a communication.

31. The system of claim 17, further comprising an authentication sub-module configured to authenticate a source of the communication.

32. The system of claim 17, further comprising a data security sub-module configured to add data security protection to a communication and remove data security protection from a communication.

33. The system of claim 32, wherein the data security sub-module is further configured to encrypt and decrypt the data payload.

34. The system of claim 32, wherein the data security protection comprises a digital signature.

35. The system of claim 17, further comprising an access control sub-module configured to manage an access control policy of the system.

36. A system for secure communication between a wireless application protocol (WAP) wireless device and a target network, the system comprising:
- an interface configured to receive a communication from a WAP gateway over a trusted wireless network, the communication originating from the WAP wireless device and destined for a target network; and
- a channel manager configured to establish a secure channel with the target network and configured to send the communication to the target network, wherein the interface receives the communication and sends the communication to the target network over the secure channel, the secure channel extending to the target network from a communication module positioned between the target network and the trusted wireless network, and wherein the secure channel does not extend over the trusted wireless network.

37. The system of claim 36, wherein the secure channel is a virtual private network (VPN).

38. The system of claim 36, wherein the communication destined for the target network comprises a data payload and a WAP header, and wherein the WAP gateway is configured to reformat the WAP header as an Internet Protocol (IP) header.

39. The system of claim 38, wherein the WAP gateway is further configured to locate the interface and forward the reformatted communication to the interface.

40. The system of claim 36, wherein the interface is further configured to send an encapsulated communication to the target network.

41. The system of claim 36, wherein the interface is further configured to send a communication having data security protection to the target network.

42. The system of claim 36, wherein the interface is further configured:
- to receive a communication addressed to the WAP wireless device over the secure channel; and
- to send a communication originating from the target network to the WAP wireless device over the trusted wireless network.

43. The system of claim 42, wherein the communication destined for the WAP wireless device comprises a data payload and an IP header, and wherein the WAP gateway is configured to reformat the IP header as a WAP header.

44. The system of claim 36, further comprising an encapsulation sub-module configured to encapsulate and decapsulate a communication.

45. The system of claim 36, further comprising an authentication sub-module configured to authenticate a source of the communication.

46. The system of claim 36, further comprising a data security sub-module configured to add data security protection to a communication and remove data security protection from a communication.

47. The system of claim 36, further comprising an access control sub-module configured to manage an access control policy of the system.

48. A system for secure communication between a wireless device and a target network, the system comprising:
- means for negotiating a secure channel with a target network, the secure channel extending to the target network from a communication module positioned between the target network and the trusted wireless network;
- means for receiving a communication originating from a wireless device over a trusted wireless network, the communication comprising a data payload; and
- means for sending the communication to the target network,
- wherein the secure channel does not extend over the trusted wireless network.

49. The system of claim 48, further comprising means for receiving a communication addressed to the wireless device over the secure channel.

50. The system of claim 48, further comprising means for sending a communication originating from the target network to the wireless device over the trusted wireless network.

51. The system of claim 48, further comprising means for encapsulating a communication.

52. The system of claim 48, further comprising means for authenticating the source of the communication.

53. The system of claim 48, further comprising means for adding data integrity protection to the communication.

54. The system of claim 48, further comprising means to encrypt the data payload.

55. The system of claim 48, further comprising means for managing an access control policy of the system.

\* \* \* \* \*